United States Patent [19]

Jarczynski

[11] Patent Number: 5,189,325
[45] Date of Patent: Feb. 23, 1993

[54] LIQUID COOLING THE ROTOR OF AN ELECTRICAL MACHINE

[75] Inventor: Emil D. Jarczynski, Scotia, N.Y.
[73] Assignee: General Electric Company, Schenectady, N.Y.
[21] Appl. No.: 539,825
[22] Filed: Jun. 15, 1990
[51] Int. Cl.$^5$ .......................... H02K 9/00; H02K 9/20
[52] U.S. Cl. ......................................... 310/54; 310/61
[58] Field of Search ....................... 310/54, 52, 59, 61, 310/269

[56] References Cited

U.S. PATENT DOCUMENTS

| | | | |
|---|---|---|---|
| 3,240,967 | 3/1966 | Krastchew | 310/54 |
| 3,521,094 | 8/1968 | Renz et al. | 310/58 |
| 3,742,266 | 6/1973 | Heller et al. | 310/54 |
| 4,182,137 | 1/1980 | Erth | 310/61 |
| 4,303,842 | 12/1981 | Nathenson | 310/269 |
| 4,315,172 | 2/1982 | Intichar et al. | 310/61 X |
| 4,365,176 | 12/1982 | Nathenson et al. | 310/54 |
| 4,728,840 | 3/1988 | Newhouse | 310/54 |
| 4,943,746 | 7/1990 | Scherzinger et al. | 310/61 |

Primary Examiner—Steven L. Stephan
Assistant Examiner—E. To
Attorney, Agent, or Firm—Nixon & Vanderhye

[57] ABSTRACT

At least one liquid coolant passage is disposed within at least a pair of pole bodies in an electrical machine rotor. The liquid coolant passage is thermally coupled to pole loss heat caused by eddy currents and/or windage in the radially outermost portion of the rotor pole bodies. A rotatable liquid transfer coupling is fluid connected with the liquid passage(s) for transferring liquid coolant to and from the coolant passage(s) during machine operation. Preferably, a liquid coolant passage is included in each of N circumferentially spaced magnetically permeable pole bodies on the rotor. It is also preferable to include additional liquid coolant passages thermally coupled primarily to rotor windings within each coil slot of a typical rotor and fluid connected (either in parallel or in series) with the pole body liquid coolant passages.

27 Claims, 4 Drawing Sheets

LIQUID COOLING THE ROTOR OF AN ELECTRICAL MACHINE

RELATED APPLICATION

This application is related to my commonly assigned copending U.S. patent application Ser. No. 07/539,829, filed concurrently herewith and entitled "Stator Cooling System For Electrical Machinery", now U.S. Pat. No. 5,091,666, the entire content of same hereby being expressly incorporated by reference.

1. Field of the Invention

This invention generally relates to rotating electrical machinery such as electrical generators and motors. This invention is more specifically related to method and apparatus for liquid cooling the rotor of such electrical machinery.

2. Background of Prior Art Approaches to the Problem

Rotating electrical machinery such as generators and motors is well known and has long been commercially available. It is also well known that such electrical machinery suffers energy losses during operation which are manifested by thermal energy or heat generated within the various machine components. For many higher power, heavy duty embodiments of such machinery, it is also necessary to actively remove such heat for normal operation.

Most commonly, the rotating components (i.e., the "rotor" components) are cooled with air or some other gas because it is relatively simple to incorporate the necessary gas cooling ducts. However, in high power density machinery, the large volume associated with gas cooling ducts, both internal to the machinery and the external flow passages to heat exchangers and the like, compromise the design goal of compactness. Thus, for many electrical machines (e.g., high speed generators and drive motors), liquid cooling of the rotor components is especially appropriate.

Since a large component of generated heat is often due to joule heating of the rotor field winding conductors, some prior art approaches have employed liquid coolant passages directly within one or more of the winding conductors. However, as will be appreciated by those in the art, when the liquid coolant is routed into actual contact with electrical conductors, then the liquid coolant must act as a dielectric. For example, deionized water has been used in the past. However, the associated auxiliary equipment necessary for maintaining an appropriately deionized supply of coolant (e.g., water) can become a significant unattractive feature of this technique.

Other prior art approaches have utilized coolant passages thermally coupled within a winding slot to the electrical conductors While yet being electrically insulated from those conductors. For example, a cooling tube may be disposed at the bottom of a winding slot and thermally coupled via various thermal fin structures dispersed within and between insulated conductors within the winding slot. Prior art approaches of this type known to the applicant were, however, restricted to use of a liquid bearing lubricant for the coolant material (i.e., because the coolant transfer passages were routed through bearing lubricant supply passages). Because such lubricant oil coolant has less than optimum thermal properties, it was necessary in this prior instance to include internal thermal transfer fins within the coolant passage (thus adding to expense, complexity, pressure drop, space factor, etc.).

It is, of course, also known that rotor heating is caused by sources in addition to joule heating of the field winding. For example, induced eddy currents within the magnetic circuit of rotor pole bodies cause joule heating of the pole bodies themselves (which are typically also somewhat electrically conductive—even if only within individual laminations of a laminated rotor). Furthermore, if the rotor is vented to ambient atmosphere or the like, then there may also be significant windage or air friction heat sources at the outer surface of the rotor.

In high power density electrical machinery, various methods are used to maximize power output. For example, magnetic flux density may be increased and/or the rate of cutting the magnetic flux may be increased (e.g., by higher rotor speeds or higher electrical frequency). The current density flowing within winding conductors may also be increased. However, such maximum utilization of material and space inevitably contributes to intense internal heating of the rotor structure.

Since the electrical insulation of the rotor winding is subject to a limited temperature rating, the effective operating temperature of the machine components typically imposes a limit on the ultimate overall power rating of the machine. Furthermore, thermally induced stresses in the machine components can become severe (causing unbalanced rotation and vibration when the operating temperatures are high or unevenly distributed).

When compactness is a design objective (as it typically is), then clearly a minimum of machine volume should be dedicated for cooling passages. However, in typical conventional machine designs, specific machine volume and weight are not severely constrained so that somewhat larger gas flow ducts and heat surfaces remain acceptable. Thus, the vast majority of generators and motors have air cooled rotors due to the simplicity of design and construction. Gases other than ambient air (e.g., hydrogen) may also commonly be used when more effective cooling of the rotor is required (e.g., for example, in large power plant utility generators).

BRIEF SUMMARY OF THE INVENTION

Generally, one design objective is to provide sufficient cooling capacity from a minimum number of well placed minimum sized coolant passages so as to sufficiently cool all rotor components. For higher power density machines, the larger and more significant amount of heat generated from distributed internal sources requires more effective heat removal from all components. Thus, smaller volume flow areas associated with liquid cooling become more attractive.

As noted earlier, previous high power density generators have already used liquid cooled rotors—but, the prior art designs still have significant room for improvement for reasons already noted above (including the greater flexibility in choice of coolant to be used so that the coolant can be chosen based on thermal properties, availability and particular applications).

Based on a recent series of detailed thermal performance calculations, it has been discovered that a higher than previously thought proportion of rotor losses are actually pole losses (e.g., as contrasted with winding losses). That is, eddy current losses and/or windage heating of the rotor pole bodies contributes a quite significant portion of total rotor losses. Such losses represent heat sources at the radially outermost portions of the rotor pole bodies.

In connection with such studies, I have also discovered a more optimum arrangement of liquid coolant passages and thermally conductive paths within a liquid cooled rotor of an electrical machine.

In particular, in addition to the usual liquid coolant passages primarily thermally coupled to electrical rotor windings, this invention provides coolant passages primarily thermally coupled to the rotor pole bodies. Optimally, such additional coolant passages are disposed so as to also have some thermal coupling (via the pole body itself) to some of the electrical conductors that are relatively more remote from coolant passages disposed within the winding slots. Thus, the additional coolant passages provided by this invention not only provide for direct control over higher pole losses, they also help to better control winding losses as well. Typically, such optimal location is disposed radially intermediate the outer rotor surface and the location of coolant passages within the winding slots.

The general arrangement of an exemplary embodiment of this invention may be thought of as having a "two-pass" coolant flow within each pole stage of a salient pole AC electrical machine, (although the application is not limited to this particular kind of machine). One "pass" of the coolant flow is conventional through the coil slot itself. Heat removal from the field winding is aided by high thermally conductive fins and wedges placed between coil conductors and in contact with the coolant passage. A second or return "pass" of the coolant is via a magnetic pole body to dissipate heat from the outer pole surfaces (e.g., caused by eddy current losses and windage losses).

If a shaft-mounted rotating alternator (or "exciter") is used to supply excitation power to the main rotating field windings, then the cooling system of this invention can also be configured to simultaneously cool the alternator. For example, the rotating alternator may be fitted to a partially hollowed shaft such that coolant passes through the shaft, (e.g., on its way to coolant passages in the rotor pole bodies and winding slots). Heat generated within the rotating alternator may then be preferentially conducted radially inwardly towards and through the shaft to the coolant passage. Such radially inward thermal conduction paths can be improved by incorporating high thermally conductive end plates, as well as high thermally conductive non-magnetic laminations interspersed within the laminated magnetic core of the alternator. For example, some of the techniques claimed in my above referenced copending and related application may be used for this purpose.

This invention provides a cooling arrangement for the rotor of an electrical machine which effectively removes h ®at from all known heat generating components and thus helps to maintain more acceptable operating temperatures (especially within higher power density machine designs). The coolant passages to be used internal to the machine preferably should occupy minimum volume (as should the external support equipment e.g., heat exchangers, pumps, filters, etc.).

The choice of coolant preferably is sufficiently flexible that it can be based solely on required thermal performance, availability and suitability for the application—the choice being limited only by general compatibility with the flow passage materials used in the system (and not because of any electrical contact with electrical conductors or common passageways with bearing lubrication oils or the like).

This invention provides higher power density machinery with enhanced thermal performance, higher reliability and a minimum of complexity. Specific applications may include, for example, ship service generators, aerospace generators, and drive motors, floating platform generators—or any application where minimizing machinery space and weight without compromising reliability are desirable.

These as well as other objects and advantages of this invention will be more completely understood and appreciated by careful study of the following detailed description of presently preferred exemplary embodiments taken in conjunction with the accompanying drawings, of which:

DETAILED DESCRIPTION OF PRESENTLY PREFERRED EXEMPLARY EMBODIMENTS

Figure 1:
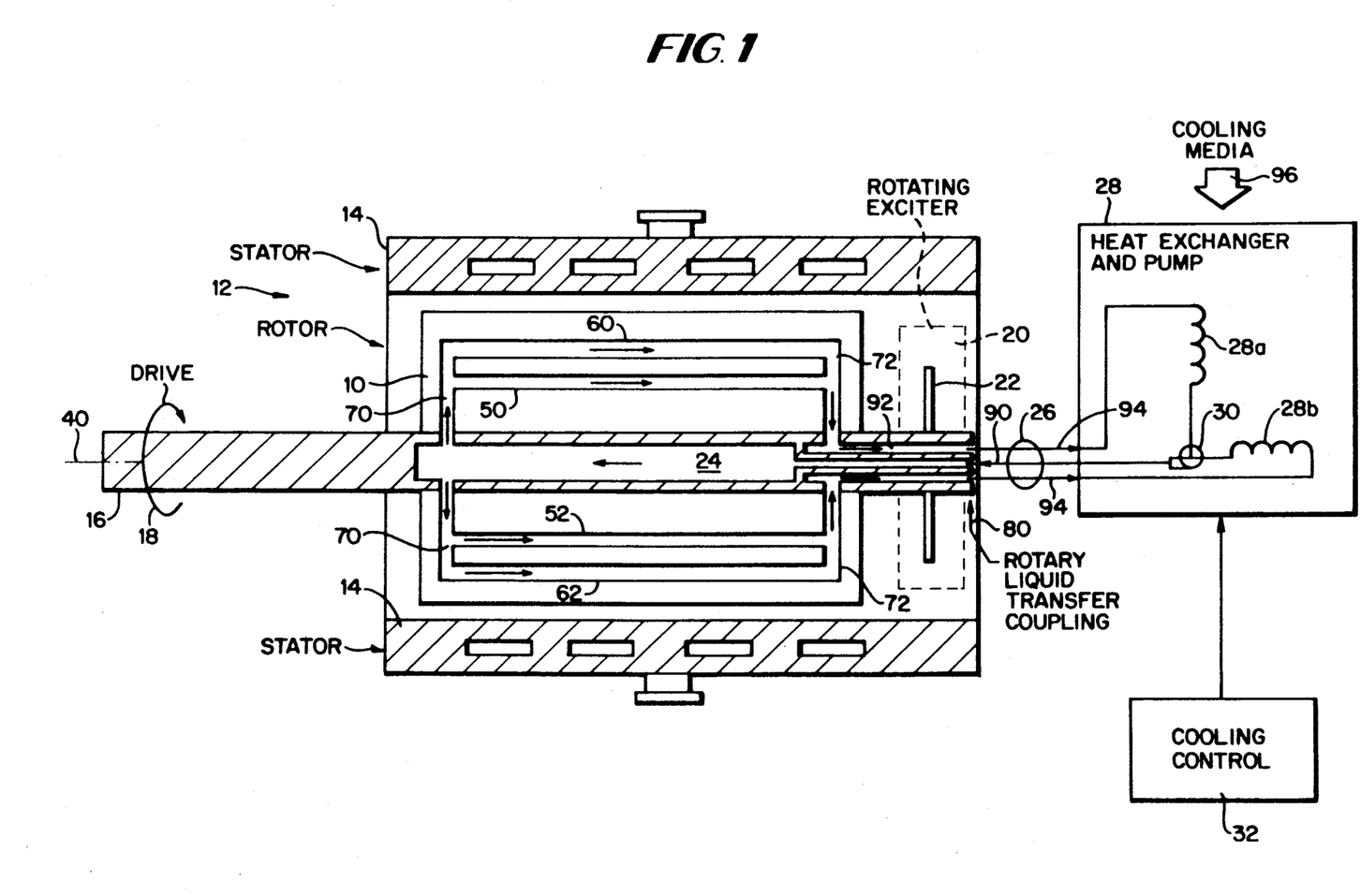
FIG. 1 schematically depicts a first exemplary embodiment of this invention wherein plural liquid coolant flow passages within a rotor are radially offset from one another and fluid connected in parallel with liquid coolant supply passages within a partially hollowed central shaft fed via a rotary liquid transfer coupling.

The liquid cooling arrangement schematically depicted in FIG. 1 is for the rotor 10 of an electrical machine 12 (e.g., a generator or drive motor) also having suitable stator structure 14 and a central drive shaft 16. The exemplary application here described relates to a high speed, high power density rotor of the salient pole type, but the concept is not limited to this configuration.

If the machine is a generator, then it is suitably driven (e.g., by a steam or gas turbine and suitable coupling) schematically depicted by arrow 18 in FIG. 1. If a shaft mounted AC alternator 20 is used (e.g, to feed exciting power to the main rotor field winding) it can also be cooled by the same liquid flow system (e.g., by radially extending thermally conductive structures 22 for conducting generated heat radially inwardly to the partially hollowed out portion of shaft 18 through which liquid coolant 24 is passing).

In high speed AC machinery, heat sources are distributed among several components. There is joule heating from current flow in the main rotor field winding. There is heating at the rotor surface from high frequency harmonic eddy currents induced by the armature winding. And, there is air friction heating due to the high peripheral rotor speed (e.g., if the machine is vented to ambient atmosphere). Furthermore, as already mentioned, if an alternator 20 is used, then that is also a source of heat. The cooling system for liquid coolant 24 should be capable of removing heat from all the heat sources and maintaining acceptable operating temperatures in all components of the rotor during its anticipated high power density operation.

The inherent thermal characteristics of liquid coolants permit the coolant passages to be smaller for liquids than for gaseous coolants. Similarly, external piping 26 and heat exchangers, pump, etc. 28 occupy less volume in an all liquid system. If the liquid coolant does not come into direct contact with exposed electrical conductors (i.e., uninsulated portions), then the dielectric properties of the fluid coolant do not govern any selection criteria. For example, if water is used as the rotor liquid coolant, it does not need to be deionized. Therefore, the volume and cost of a deionizing system is saved (e.g., as compared with many conventional rotor cooling systems that must use deionized water for passing it directly within and through the conductors).

The system depicted in FIG. 1 not only electrically isolates coolant fluid passages from the electrical conductors, it also isolates them from the rotor lubricating system (i.e., bearing oil). Therefore, the choice of coolant fluid in the exemplary embodiment of FIG. 1 may be made strictly based upon its thermal performance and suitability for the particular application.

For variable speed applications, the externally pumped coolant flow (e.g., pump 30 under suitable cooling system control 32) is especially advantageous because the flow rate can be controlled essentially independent of rotor speed (quite unlike self-pumped gaseous cooled rotors).

As schematically shown in FIG. 1, rotor 10 is overall an essentially cylindrical member rotatable about central axis 40. Axially extending fluid passages 50, 52 are, in this exemplary embodiment, primarily thermally coupled to windings in winding slots. Axially extended fluid liquid coolant passages 60, 62 are, in this exemplary embodiment, primarily thermally coupled to pole bodies of rotor 10. As schematically depicted in FIG. 1, the pole body coupled liquid passages 60, 62 are typically disposed radially outwardly with respect to the winding slot liquid coolant passages 50, 52 (e.g., so as to more optimally couple to pole losses such as eddy current and windage losses).

As shown in the exemplary embodiment of FIG. 1, the axially extended coolant passages 50, 52 are fluid connected in parallel with the axially extended liquid coolant passages 60, 62 by radially extended input/output passages 70, 72. These connecting passages 70, 72 also hydraulically communicate with centralized connecting fluid passages formed in a partially hollowed portion of drive shaft 16.

In this manner, via a conventional rotary liquid transfer coupling 80, an input liquid coolant flow 90 (e.g., the output from controlled pump 30) flows into the right hand portion of drive shaft 16. This input flow ultimately passes through radially extended input passages 70 to an input side of axially extended passages 50, 52 and 60, 62. This parallel connected and divided flow path is then rejoined at the output side by radially extended output passages 72 into an annular hollow shaft passage 92 so as to provide output liquid coolant flow 94 to heat exchangers 28A and 28B (exchanging heat with a suitable further cooling medium 96 as will be appreciated by those in the art).

With a two-pass coolant flow through the main rotor body as depicted in FIG. 1, the coolant passages are distributed between the coil slots (where field winding heat is generated) and the magnetic pole bodies (where high frequency eddy current heating and windage losses can be removed from the pole faces). This arrangement places the coolant passages closest to various separate sources of heat, thereby greatly reducing thermal conduction temperature gradients as compared to a conventional single coolant pass configuration through the coil slot alone (e.g., as in the prior art).

In the illustrated example of FIG. 1, there is one passage per pole slot and a second coolant passage through the pole body of that same stage (there being N poles circumferentially spaced around rotor 10 with a coil winding slot disposed between each of the adjacent spaced apart pole bodies). However, multiple smaller and more spatially distributed passages per flow "pass" can also be used.

Figure 2:
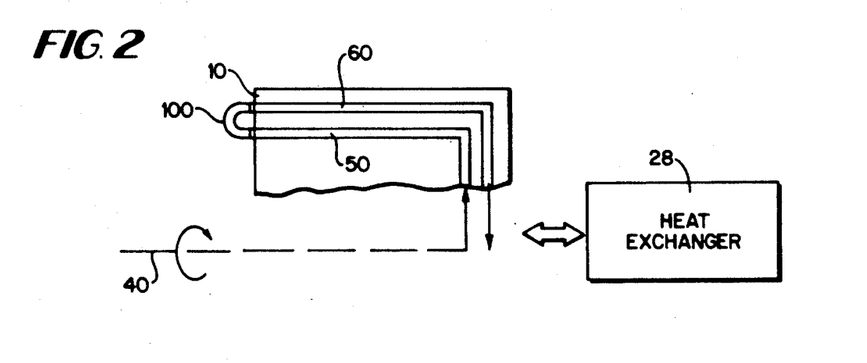
FIG. 2 is a schematic partial view of an alternate embodiment wherein plural radially offset liquid coolant passages within an electrical machine rotor are connected in series.

The flow arrangement may be made with passages 50 and 60 connected in parallel as shown in FIG. 1. Alternatively, as depicted in FIG. 2, the liquid coolant fluid circuit may be configured so that the two passages are connected in series by incorporating a return manifold connection 100 at one end. In either case, a rotating fluid transfer coupling 80 is used opposite the drive end 18 of shaft 16 to introduce the coolant into the hollowed shaft end and to discharge it from the rotor after passage through the fluid cooling circuits.

As should also now be appreciated, depending upon the distribution of heat sources and rotor hot spots anticipated for a particular rotor design, the flow direction can be reversed or otherwise spatially shifted from that depicted in the exemplary embodiments.

Furthermore, if a rotating alternator or exciter 20 is used, it can be mounted on the hollow shaft section having coolant flowing through it—and therefore be cooled by the liquid coolant (to which the exciter heat may be rejected by suitable radially extending thermal conduction structures as already described).

The radially extended passages 70, 72 interconnecting the axially extended liquid coolant passages 50, 52 and 60, 62 in FIG. 1 may be formed by suitably drilling a solid rotor shaft (followed by suitable end plugging of the drilled holes, e.g., by welding). Suitable tubing inserts may be made through such passageways if needed (e.g., in the case of laminated rotors).

Figure 3A:
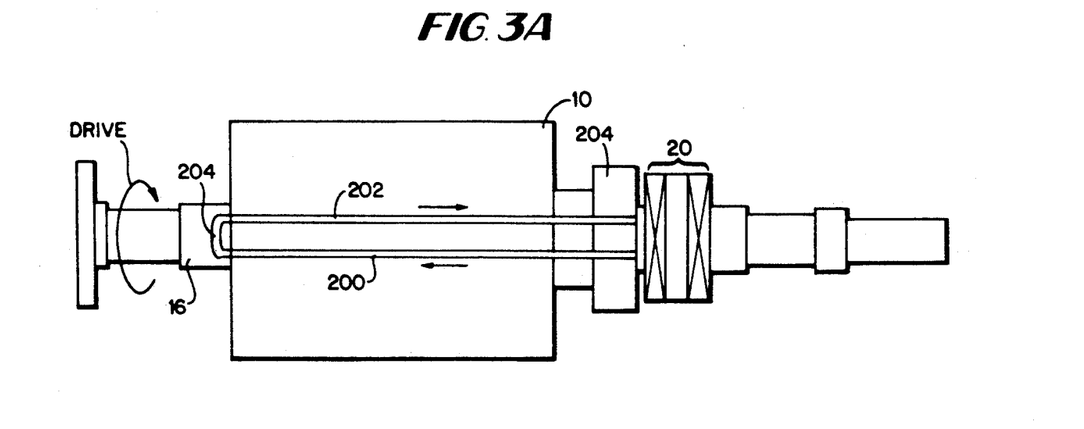
FIGS. 3A and 3B are plan and side views, respectively, of an alternate exemplary embodiment wherein liquid coolant flow paths are connected in series with coolant input/output connections being made via a partially hollow central shaft and manifold system disposed axially spaced from an end of the main rotor components (and preferably between any exciter coil member and the main rotor components)
Figure 3B:
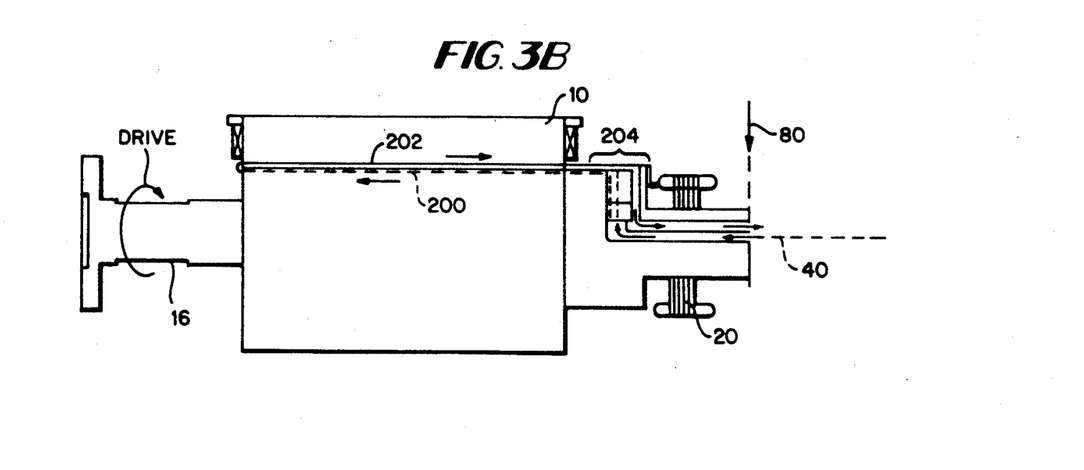

If radial drilling of rotor 10 itself is not desirable, then the embodiment of FIGS. 3A and 3B may be utilized. Here, the axially extended liquid passages 200 and 202 (which may be most conveniently drilled into rotor 10) are connected in series by a U-shaped passage 204 at the driven end of shaft 16. In this arrangement, all of the input/output fluid connections to the axially extended passages can be made external to the main body of rotor 10.

For example, as schematically depicted in FIGS. 3A and 3B, connections to the hollowed shaft passages may be made via a suitable manifold block 204 disposed between exciter 20 and an end of rotor 10. Block 204 includes passages in fluid communication between the end of serially connected axially extended passages 200, 202 and hollow shaft passageways which, in turn, communicate with a conventional rotary liquid transfer coupling 80 (as in the embodiment of FIG. 1).

Figure 4:
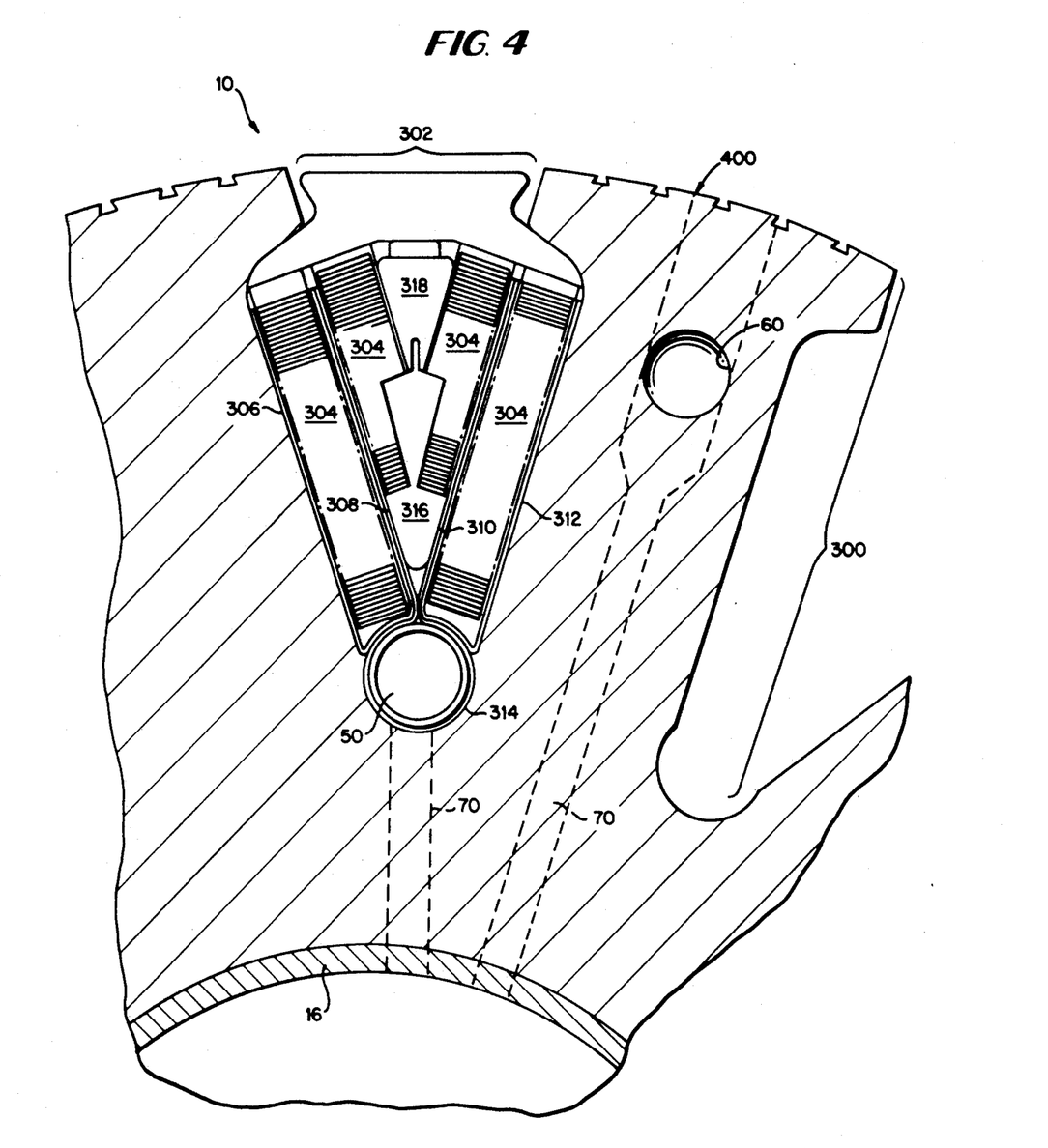
FIG. 4 is a radial cross-section through a rotor body showing an exemplary two pass cooling system.

In the schematic cross-sectional depiction of FIG. 4, more detail of a typical salient pole rotor structure 10 is depicted. For example, a few of the N circumferentially spaced apart, magnetically permeable pole bodies 300 are depicted with intervening rotor field winding coil slots 302. As may be easily seen in FIG. 4, the axially extended liquid coolant passages 50 are located at the radially innermost ends of winding slots 302. Thermal coupling to passage 50 is primarily with the insulated electrical conductor windings 304 via thermally conductive (e.g., copper) heat transfer fin structures 306, 308, 310 and 312 (including a tubularly wrapped component 314 interference fit to the exterior of axially extended coolant passageway 50). Thermally conductive wedges 316 and 318 (e.g., non-magnetically permeable aluminum) also help ensure a good thermal connection between the insulated electrical windings 304 within winding slot 302 and the heat transfer fins, 306, 308, 310, 312, 314 and the fluid passageway 50.

Radially extended input passages 70 are also shown in dotted lines at FIG. 4 (it being understood that the radially outward end of passage 70 (i.e., beyond axially extended coolant passage 60) would be suitably plugged after drilling operations). As depicted in FIG. 4, these passages 70 communicate with the coolant supply via hollow shaft 16.

As previously mentioned, it has been discovered that a significant amount of heat is generated in pole losses at the rotor periphery (e.g., denoted by arrow 400 in FIG. 4). It is also known, of course, that a significant heat source is via joule heating of the electrical winding conductors 304. By judiciously placing additional liquid passage 60 within the pole body 300 (and thus primarily thermally coupled thereto) one can efficiently control the pole loss heat source. At the same time, since the radially outermost conductors 304 are not as strongly coupled to coolant passage 50, there is also some thermal conduction of heat from these outermost conductors through the side walls of pole bodies to coolant passage 60. Preferably, the passage 60 is optimally located so as to effect maximum composite heat transfer from the combination of periphery 400 and the heat entering the pole body from adjacent winding slots 302.

Thus, as shown in FIG. 4, coolant passage 60 in its associated pole body dissipates heat from the rotor periphery 400 (e.g., high frequency harmonic currents and windage) as well as heat from the field coil 304 transmitted through the side surfaces of the pole body 300. Of course, coolant tube 50 also is positioned in the coil slot 302 with an attached fin assembly 306 et. seq. to primarily remove heat generated in the field coil 304.

Figure 5:
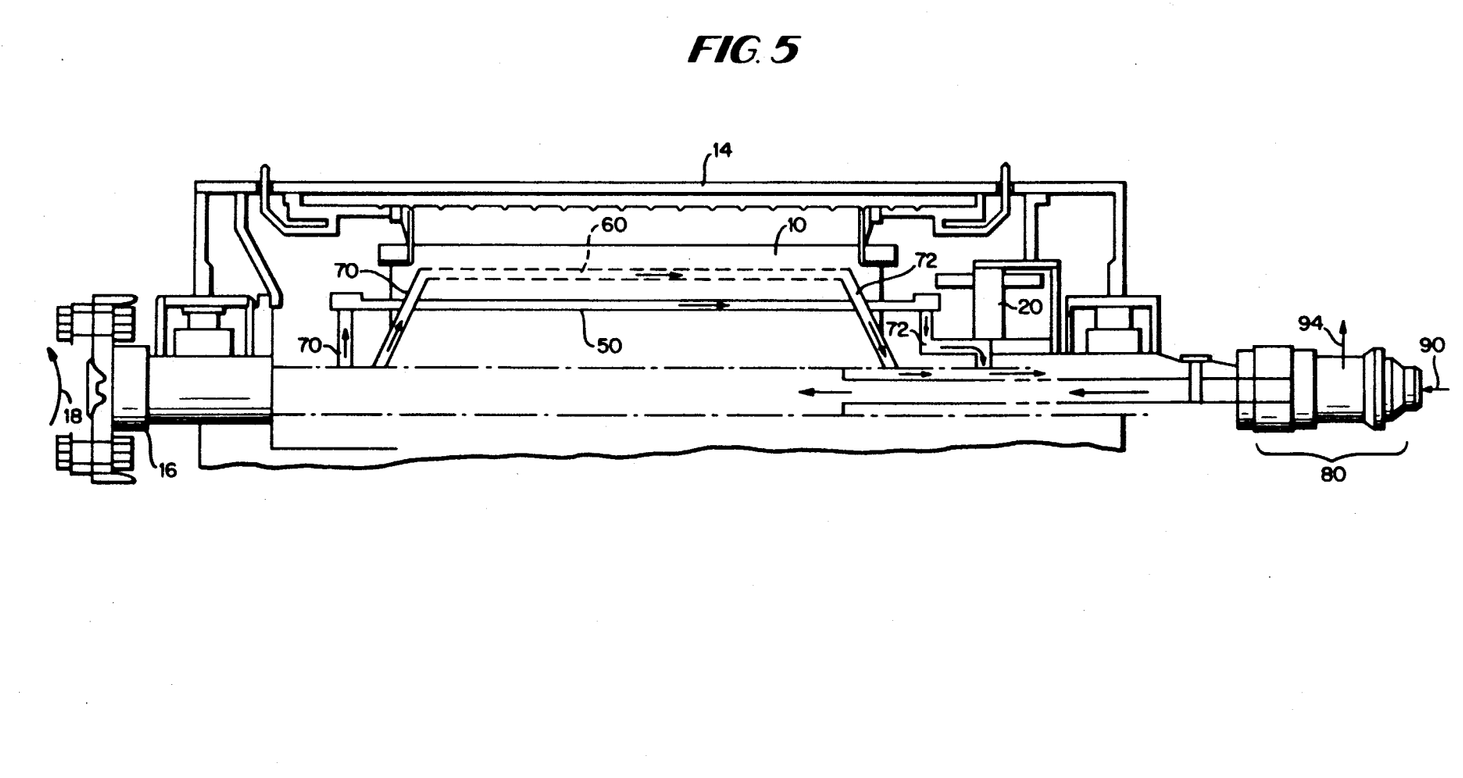
FIG. 5 depicts an axial cross-section through the same rotor body depicted in FIG. 4 and illustrating the two-pass parallel flow arrangement.

The axial cross-section shown in FIG. 5 should now be substantially self-explanatory and reference numerals already explained have been used in conjunction with FIG. 5. As may be seen, coolant enters the non-driven end of hollow shaft 16 through a rotating fluid transfer coupling 80 and divides between slot coolant tubes 50 and pole body passages 60. At the opposite end, coolant fluid reenters hollow shaft 16 and the various flows are recombined. Overall inlet and outlet flows 90, 94 are separated inside the hollow shaft with suitable flow dividers as should now be apparent to those in the art.

Thus, in the exemplary embodiment of FIG. 5, coolant enters the rotor through a rotating fluid transfer coupling 80 and flows axially through the hollow shaft 16 towards the coolant manifold (e.g., radially extending—and possibly somewhat axially—extending internally drilled input/output manifold passages 70, 72). The inlet flow 90 is separated from the outlet flow 94 by conventional annular dividers fitted inside the hollow shaft 16. The exiting flow, of course, discharges through common fluid transfer coupling 80.

For the illustrated exemplary embodiment, it is assumed that the rotor may be made from a solid forging which can be drilled to directly form pole body fluid passages. A solid forging presents a solid continuous heat conductance path between the heat sources and the coolant. However, other constructions such as magnetic laminations mounted onto a shaft are also possible. With a laminated structure, a coolant tube would be inserted into a hole within the pole body to contain the fluid. In either case, sets of radial holes may be drilled into the shaft so as to bring fluid out into the rotor body and to discharge it back into the hollow shaft.

For a two-pass flow system and salient pole construction as here depicted (e.g., with a single coolant passage per "pass" as assumed for this example), the number of coolant passages to be formed equals the number of magnetic poles N plus the number of coil slots (e.g., N). However, as already indicated, multiple passages per flow "pass" may also be used.

The coolant passage in coil slot 302 is made from a tube 50 placed within the radially inward portion of slot 302. The tube is hydraulically connected to coolant manifolds which may be an integral section of the solid shaft raised to a larger diameter and which contain a set of radial inlet and outlet holes (all of the initially exposed ends of the drilled holes on the rotor surfaces may be subsequently welded closed so as to contain the fluid circuit). The coolant tube 50 is thermally coupled to the field coil 304 in slot 302 through high conductivity fins 306 et. seq. which are held tightly pressed against the insulated field coil conductors by wedges 316, 318 (which are also formed of a high conductivity material such as aluminum). The field coils 304 are electrically isolated by conventional insulation associated with each conductor. The fin assembly is tightly fitted around the coolant tube 50 as depicted in FIG. 4.

For a solid rotor forging, the coolant passages 60 in the magnetic pole body 300 can be simply made from a continuous drilled hole intersecting radially drilled holes 70, 72 which penetrate the hollow shaft bore as shown in FIG. 5. The outermost ends of the radially and axially drilled holes are plugged (as noted above) after drilling so as to properly contain the final fluid passageways. The radial location of the axially extended hole 60 can be optimized so that it is in relatively close proximity to the rotor periphery thereby to remove heat from the high frequency eddy currents and windage—as well as heat flowing laterally through the pole body sides from the field coil.

The field coil conductors are surrounded by electrical insulation which imposes a thermal limit on operating temperatures. Thus, this exposure of the coil heat flow paths to both coolant passage flows 50, 60 will better relieve local hot spots and produce more uniform temperatures than either single passage alone.

With the parallel flow embodiment, inlet and outlet manifolds may be located at opposite ends of the shaft as depicted in FIG. 5.

With a series flow embodiment (e.g., FIGS. 3A and 3B), two sets of inlet and outlet holes may be displaced axially in a common manifold 204 with a suitable flow divider between them. The coil slot tubes 50 are hydraulically connected to the coolant manifold forming continuous flow passages. After passing through the radial inlet holes, the flow turns axially and enters coolant tubes 50 positioned in each of the coil slots 302.

After discharging from the tubes at the opposite end of the rotor body 10, the flow returns and reenters a second pass through passage 60 in pole body 300 in this serial flow embodiment.

The return arrangement can be configured in numerous ways. For example, the axial coolant tubes 50, 60 may extend slightly beyond the length of the main magnetic rotor body 10 where they form a 180° turn through a "U" shaped joint thus causing the flow to reenter the rotor through an axial hole in magnetic pole body 300. The entrance hole may be initially positioned radially below the field coil (e.g., at the base of pole body 300) to allow access to the rotor body. With simple further drilling (radially and axially intersecting holes), the pole body coolant passage 60 may then be brought out to a higher radius for optimum positioning. As an alternate to a simple "U" joint connection, the slot coolant tube 50 output can be brought to a shaft output manifold similar to the inlet end, except that no radial holes into the shaft bore are needed. Instead, the flow would enter the manifold just to be redirected into discharge tubes which carry it back into rotor body 10.

Although only a few exemplary embodiments of this invention have been described in detail, those skilled in the art will recognize that many variations and modifications may be made in these embodiments while yet retaining many of the novel features and advantages of this invention. Accordingly, all such modifications and variations are intended to be included within the scope of the appended claims.

What is claimed is:

1. An electrical machine having a cylindrical rotor rotatable about a central axis and including circumferentially spaced magnetically permeable pole bodies, the rotor including electrical windings within axially elongated slots, the machine comprising:
   a coolant tube provided in each slot for defining a liquid coolant passage passing axially along the slot and whereby the liquid coolant is electrically insulated and separated from the windings; and
   a rotatable liquid transfer coupling connected with the liquid coolant tube for transferring liquid to and from the coolant tube during machine operation.

2. An electrical machine as in claim 1, wherein the coolant tube is positioned in a radially innermost portion of the slot.

3. An electrical machine as in claim 1, further comprising:
   at least one axially-extending liquid coolant passage disposed within at least one of said pole bodies and thermally coupled to heat produced, during machine operation, in said pole bodies due to induced eddy currents.

4. An electrical machine as in claim 1, wherein the rotatable liquid transfer coupling is disposed at one end of a shaft on which the rotor is rotatable.

5. An electrical machine as in claim 3 including radially extending fluid connection passages within the rotor and fluid connected with said liquid coolant passages.

6. An electrical machine as in claim 5 wherein said rotor includes an at least partially hollow central shaft defining a pair of liquid passages and fluid connected between fluid input/output ports of said liquid transfer coupling and inlet/output ends of said liquid coolant passage(s) via said radially extending fluid connection passages.

7. An electrical machine as in claims 1 or 3 wherein said liquid coolant passage(s) is(are) internally open and unrestricted by internal heat transfer fins.

8. An electrical machine having a rotatable rotor member comprising:
   electrical current conductors which produce heat during machine operation due to electrical current flow therein;
   magnetic flux conducting structure which also produces heat during machine operation due to induced eddy currents and/or windage losses therein;
   a first liquid coolant passage thermally coupled primarily to said electrical current conductor without being electrically connected therewith;
   a second liquid coolant passage disposed within and thermally coupled primarily to said magnetic flux conducting structure; and
   means for coupling in series the first liquid coolant passage and the second liquid coolant passage whereby, during machine operation, liquid coolant first passes through one of the first and second passages and before passing through the other of the passages.

9. An electrical machine as in claim 8, wherein liquid coolant first passes through the first liquid coolant passage before passing through the second liquid coolant passage.

10. An electrical machine having a cylindrical rotor rotatable about a central axis and including N circumferentially spaced magnetically permeable pole bodies which produce heat during machine operation due to induced eddy currents, said machine comprising:
    at least one liquid coolant passage disposed within at least one of said pole bodies and thermally coupled to said heat caused by eddy currents; and
    a rotatable liquid transfer coupling fluid connected with said liquid coolant passage(s) for transferring liquid to and from the coolant passage(s) during machine operation, and wherein the rotor includes:
        a field coil winding slot disposed between each pole body and extending radially inwardly from the rotor circumference; and
        a further liquid coolant passage disposed within each said winding slot and thermally coupled to electrical windings also disposed therewithin while being electrically insulated and separate from the windings.

11. An electrical machine as in claim 10 wherein said further liquid coolant passage is fluid connected in parallel with said at least one liquid coolant passage(s) within the pole bodies.

12. An electrical machine as in claim 1 wherein said rotor includes an at least partially hollow central shaft defining a pair of liquid passages and fluid connected between fluid input/output ports of said liquid transfer coupling and inlet/output ends of said liquid coolant passage(s) via radially extending fluid connection passages.

13. An electrical machine as in claim 12 further comprising:
    a rotating field coil excitation alternator mounted for rotation on said hollow central shaft and thermally coupled thereto so as to radially transfer heat from the alternator to the hollow central shaft when coolant flows therethrough.

14. An electrical machine as in claim 1 having a plurality of axially extending liquid coolant passages fluid connected in series.

15. An electrical machine as in claim 10 wherein at least one further liquid coolant passage is fluid connected in series with at least one of the first-mentioned liquid coolant passages.

16. An electrical machine having a rotor member with salient magnetic pole members rotatable about a central axis and comprising:
   a plurality of axially extending liquid coolant passages within said rotor member, some of said passages being disposed radially outwardly of others of said passages while passing within and being thermally coupled to salient pole bodies of the rotor; and
   a rotatable liquid transfer coupling fluid connected with said liquid coolant passages for transferring liquid coolant to and from said passages during machine operation.

17. An electrical machine having a rotatable rotor member comprising:
   electrical current conductors which produce heat during machine operation due to electrical current flow therein;
   magnetic flux conducting structure which also produces heat during machine operation due to induced eddy currents and/or windage losses therein;
   a first liquid coolant passage thermally coupled primarily to said electrical current conductor without being electrically connected therewith;
   a second liquid coolant passage disposed within and thermally coupled primarily to said magnetic flux conducting structure; and
   a rotatable liquid transfer coupling fluid connected with said first and second coolant passages for passing liquid coolant to and from said coolant passages during machine operation.

18. An electrical machine as in claim 17 wherein said rotor rotates about a rotational axis, said first and second coolant passages both extend axially parallel to said rotational axis and said first liquid coolant passage is disposed radially closer to the rotational axis of the rotor than is said second liquid coolant passage.

19. An electrical machine as in claim 17 wherein:
   said rotor has plural coil slots circumferentially spaced about the rotor and in which said electrical current conductors are disposed,
   said magnetic flux conducting structure includes plural pole bodies, at least one such pole body being disposed between adjacent coil slots;
   a first liquid coolant passage is provided within each coil slot; and
   a second liquid coolant passage is provided within each pole body.

20. An electrical machine as in claim 19 wherein each first liquid coolant passage is disposed at the radially inner portion of its associated coil slot.

21. An electrical machine as in claim 20 wherein each coil slot includes plural radially extending heat transfer fins between which said current conductors are stacked, said heat transfer fins being thermally coupled to the first liquid coolant passage at the radially inward portion of the coil slot.

22. A method for cooling an electrical machine having a cylindrical rotor rotatable on a shaft about a central axis and including circumferentially spaced magnetically permeable salient pole bodies which produce heat during machine operation due to induced eddy currents, the rotor including electrical windings within axially elongated slots, said method comprising:
   pumping liquid coolant through an axially extending coolant tube defining a passage, the coolant tube being provided in each slot at a radially innermost portion of the slot whereby the liquid coolant is electrically insulated and separated from the windings;
   pumping liquid coolant though a passage which is within and thermally coupled primarily to said salient pole bodies and to said heat caused by eddy currents; and,
   transferring liquid coolant both to and from said passages during machine operation via a fluid coupling disposed at one end of said shaft.

23. The method of claim 22, wherein said liquid coolant is pumped first through the coolant tube and then through the passage, the coolant tube and passage being connected in series.

24. A method as in claim 22 wherein coolant is pumped through a passage in each pole body.

25. Method as in claim 22 wherein said liquid coolant is pumped through passages internally open and unrestricted by internal heat transfer fins.

26. A method as in claim 22 including pumping said coolant in parallel through said at least one liquid coolant passage within the pole bodies and said further liquid coolant passage.

27. A method as in claim 22 further comprising radially transferring heat from a rotating field coil excitation alternator to a hollow central shaft and passing said pumped liquid coolant flows therethrough to and/from said liquid coolant passages in the rotor.

* * * * *